(12) United States Patent
Bode et al.

(10) Patent No.: US 12,072,772 B1
(45) Date of Patent: Aug. 27, 2024

(54) CROWD SOURCED DATA RESTORES

(71) Applicant: Kyndryl, Inc., New York, NY (US)

(72) Inventors: Christopher Collins Bode, Holly Springs, NC (US); Marci Devorah Formato, Clintondale, NY (US); Cesar Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/133,815

(22) Filed: Apr. 12, 2023

(51) Int. Cl.
  *G06F 12/00* (2006.01)
  *G06F 11/14* (2006.01)
  *H04L 43/0876* (2022.01)

(52) U.S. Cl.
  CPC ...... *G06F 11/1451* (2013.01); *G06F 11/1464* (2013.01); *H04L 43/0876* (2013.01)

(58) Field of Classification Search
  None
  See application file for complete search history.

(56) References Cited

U.S. PATENT DOCUMENTS

| | | | |
|---|---|---|---|
| 8,849,761 B2 | 9/2014 | Prahlad et al. | |
| 10,025,673 B1 * | 7/2018 | Maccanti | G06F 11/1451 |
| 11,816,007 B1 * | 11/2023 | Pawar | G06F 11/2094 |
| 2005/0240591 A1 | 10/2005 | Marceau et al. | |
| 2013/0024424 A1 | 1/2013 | Prahlad et al. | |
| 2014/0173229 A1 * | 6/2014 | Reohr | G06F 3/0611 |
| | | | 711/162 |
| 2015/0106578 A1 | 4/2015 | Warfield et al. | |
| 2021/0110286 A1 | 4/2021 | Hewitt et al. | |
| 2022/0245092 A1 | 8/2022 | Jujjuri et al. | |
| 2022/0374431 A1 | 11/2022 | Kavali et al. | |

OTHER PUBLICATIONS

Mell et al., "The NIST Definition of Cloud Computing", NIST, Special Publication 800-145, Sep. 2011, 7 pages.
Unknown, "Methodology for Optimizing WAN Caching Associated with CloudObject Store Backend", IP.com, IP.com No. IPCOM000268803D, Published Mar. 1, 2022, 12 pages.
Unknown, "Restic Backups done right!", https://restic.net/, downloaded Apr. 12, 2023, 4 pages.

\* cited by examiner

*Primary Examiner* — Daniel D Tsui
(74) *Attorney, Agent, or Firm* — Erik Swanson; Rupam Bhar; Calderon Safran & Wright P.C.

(57) ABSTRACT

A computer-implemented method includes: receiving, by a computing device, a data restore request; determining, by the computing device, at least one object in response to the data restore request; and querying, by the computing device, a client population to determine at least one client which has resources and network cardinality to assist the data restore request. The at least one client creates a distributed and crowd sourced cache of objects for the data restore request.

19 Claims, 12 Drawing Sheets

CROWD SOURCED DATA RESTORES

BACKGROUND

Aspects of the present invention relate generally to a system, method, and computer program product for crowd sourced data restores and, more particularly, to a system, method, and computer program product for crowd sourced data resources from object storage platforms.

Backup and restore systems are built around an idea of having dedicated backup infrastructure that performs all backup storage activities to include tiering backed up data to external storage repositories such as object storage platforms. Many object storage platforms such as those offered in public cloud settings are available to all authenticated customers with a network connection. These objects storage platforms are designed for massive scale and parallelism. Object storage platforms also tend to have higher latency than other storage types.

In object storage platforms, data deduplication is performed to reduce costs and then chunks of deduplicated data are bundled into objects. However, even through data deduplication only uses changed data for storage, an entire object must be retrieved in object storage platforms. For example, backup software will simply make references to where the unchanged parts are already stored in its deduplication database. Accordingly, in object storage platforms, restore times may be slower than expected and traditional approaches do not take full advantage of the capabilities of object storage systems.

SUMMARY

In a first aspect of the invention, there is a computer-implemented method including: receiving, by a computing device, a data restore request, determining, by the computing device, at least one object in response to the data restore request; and querying, by the computing device, a client population to determine at least one client which has resource and network cardinality to assist the data restore request. The at least one client creates a distributed and crowd source cache of objects for the data restore request.

In another aspect of the invention, there is a computer program product including one or more computer readable storage media having program instructions collectively stored on the one or more computer readable storage media. The program instructions are executable to: initiate a data restore request; respond to the data restore request with locally generated objects of a size corresponding to the data request, the locally generated objects containing zeros; and receive data corresponding to the data request.

In another aspect of the invention, there is system including a processor, a computer readable memory, one or more computer readable storage media, and program instructions collectively stored on the one or more computer readable storage media. The program instructions are executable to: receive a data restore request; determine at least one object in response to the data restore request; and query a client population to determine at least one client which has resources and network cardinality to assist the data restore request. The at least one client satisfies a network latency requirement, a network speed requirement, a free space requirement, and a download time requirement.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
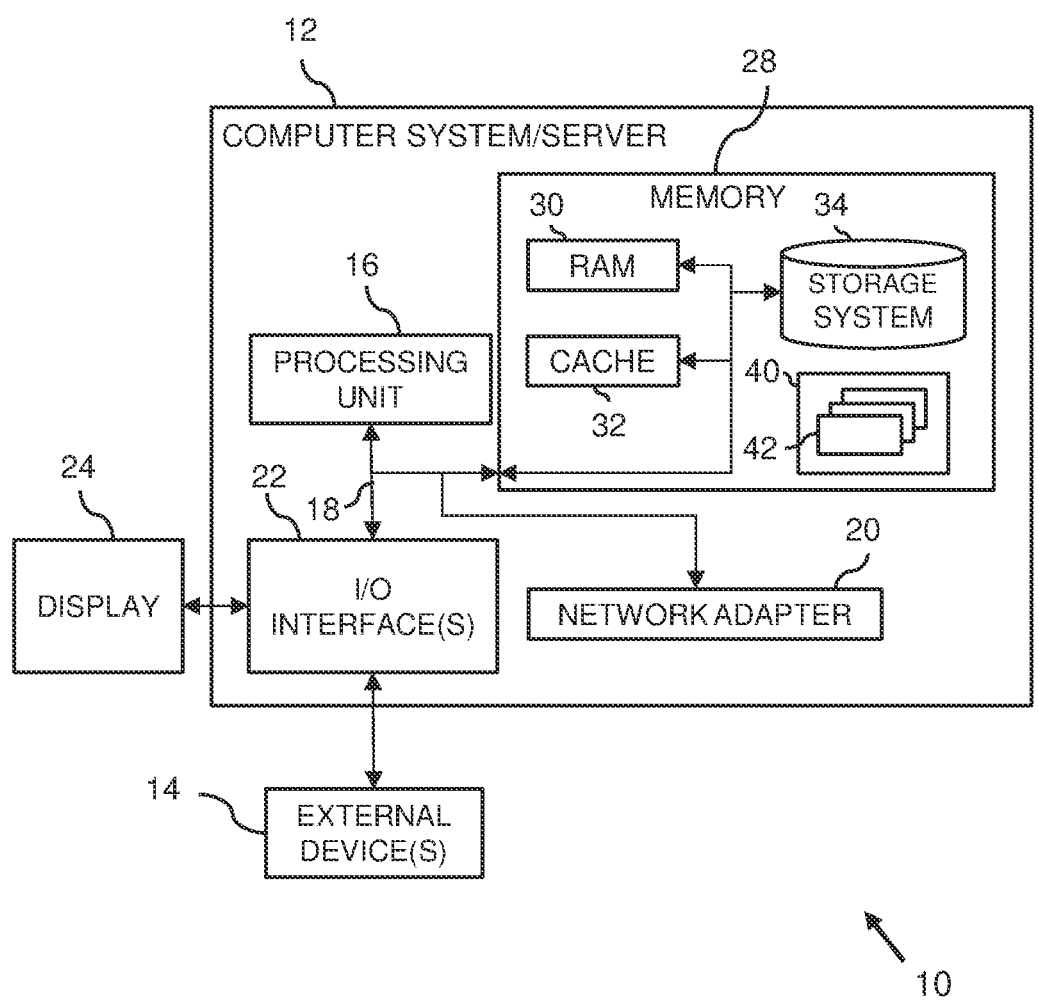
FIG. 1 depicts a cloud computing node according to an embodiment of the present invention.

Aspects of the present invention relate generally to a system, method, and computer program product for crowd sourced data restores and, more particularly, to a system, method, and computer program product for crowd sourced data resources from object storage platforms. In embodiments, the system, method, and computer program product may provide for a cost-effective solution to retrieve object storage by using a dynamic crowd source cache of data sets. Further, in embodiments, the system, method, and computer program product may determine the relevance of objects by performing an assessment of references of an object across a plurality of clients. Moreover, in embodiments, the system, method, and computer program product may create a distributed (i.e., crowd source) cache of objects across a plurality of clients based on the previous reference assessment. The distributed cache of objects may be based on a plurality of factors, which may comprise available storage on the clients, reference assessments, availability of network resources, availability of computing resources, etc. In further embodiments, the system, method, and computer program product may analyze every restore request to determine if required data is contained on the distributed (i.e., crowd source) cache of objects, in addition to performing a restore by prioritizing local resources on the distributed (i.e., crowd source) cache of objects.

Advantageously, implementations of the present invention transform restores into a multithreaded process by taking advantage of combined capabilities and resources of a peer client population. Accordingly, implementations of the present invention bypass a backup server bottleneck in known data restore systems Also, implementations of the present invention drive high concurrency to overcome latency bottlenecks in known data restore systems by utilizing the strengths of the object storage platform. For example, when clients have separate internet and software defined wide area network (SDWAN) circuits at smaller locations, implementations of the present invention may improve an overall bandwidth available to perform the data restore operations.

Further, implementations of the present invention utilize a free space across a client population to reduce the likelihood of retrieving a single object multiple times. By utilizing the free space across the client population, implementations of the present invention improve performance. Implementations of the present invention also provide a cost-effective approach to perform data restores at a customer side. In contrast to the present invention, known systems have a high cost because each transaction within a cloud provider incurs a cost when retrieving objects from an object storage platform.

Implementations of the present invention provide an improvement in the technical field of data restores by bypassing a backup server bottleneck in known systems. In more specific embodiments, the backup server bottleneck is bypassed by using multithread processes with resources of a peer client population. Implementations of the invention also provide additional improvements in the technical field of data restores by driving high concurrency and overcoming slow latency in known systems. In embodiments, high concurrency and improved latency is achieved by relying on capabilities and resources of the peer client population. Implementations of the invention also provide an improvement in the technical field of data restores by improving performance in comparison to known systems which retrieve a single object multiple times. In embodiments, performance is improved by using free space across the client population to reduce the likelihood of retrieving the single object multiple times.

In embodiments, by implementing the system, method, and computer program product herein, data restores are faster than known systems and the cost to perform data restores is reduced in comparison to known systems. Also, by implementing the system, method, and computer program product, no changes are needed to a core backend of a provider. Accordingly, implementations of the invention provide an improvement (i.e., technical solution) to a problem arising in the technical field of data restores and, in more specifically, f data restores retrieving objects using a dynamic crowd source cache of data sets.

According to an aspect of the invention, the system, method, and computer program product use a dynamic crowd source cache of data to retrieve object storage in a cost-effective manner. For example, the computer-implemented method includes: performing an assessment of references of an object across a plurality of clients; creating a distributed cache of objects across the plurality of clients based on the references assessment; updating the distributed cache of objects based on a plurality of factors; analyzing each restore request to determine if required data is contained on the distributed cache of objects; and performing a data restore by prioritizing local resources on the distributed cache of objects.

It should be understood that, to the extent implementations of the invention collect, store, or employ personal information provided by, or obtained from, individuals (for example, consumers of object storage), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
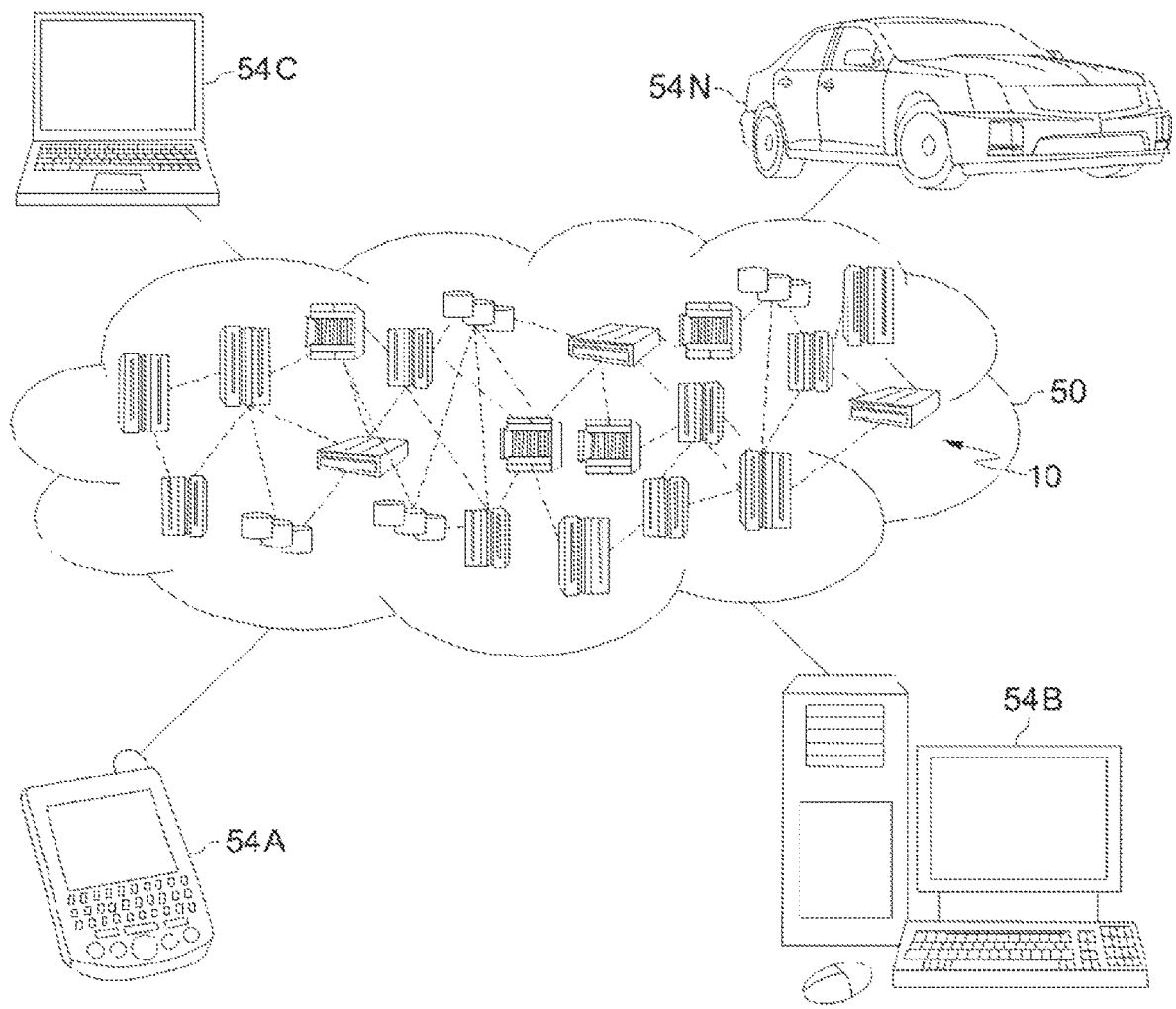
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
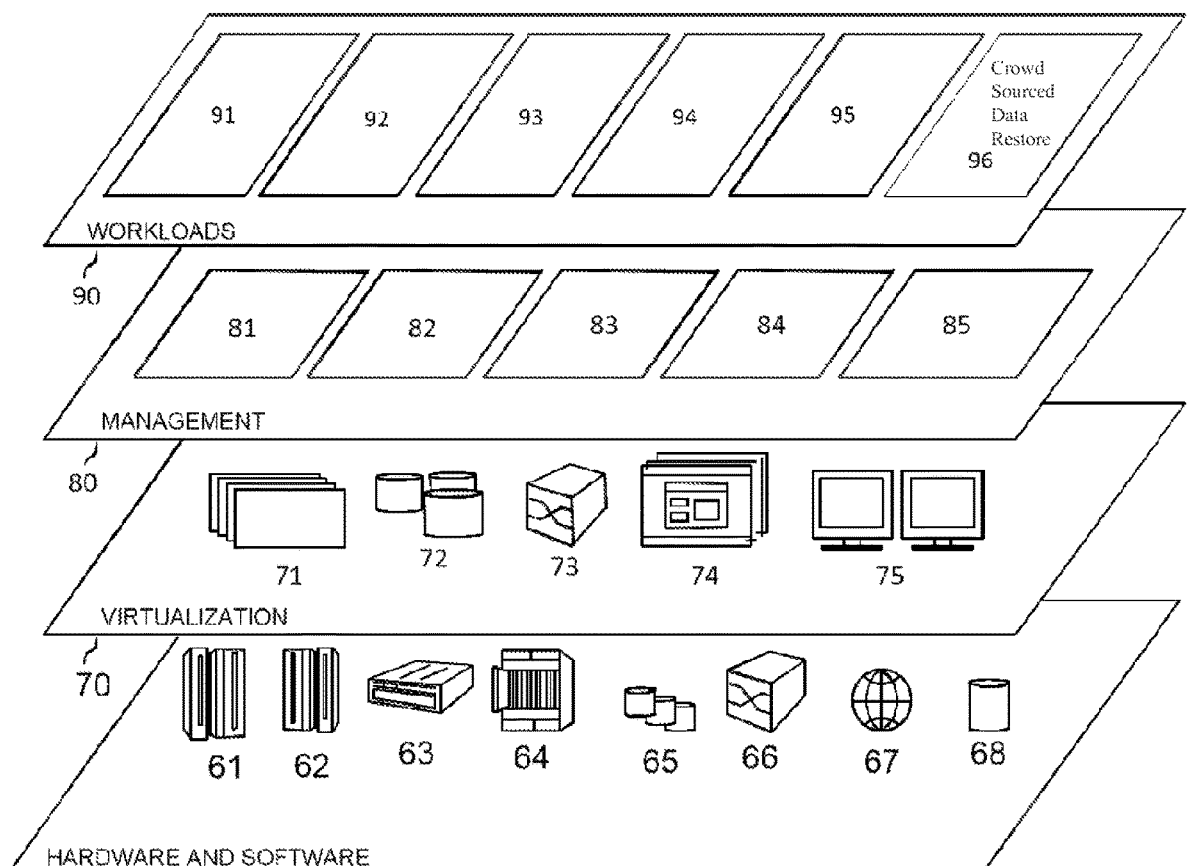
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and crowd sourced data restore 96.

Implementations of the invention may include a computer system/server 12 of FIG. 1 in which one or more of the program modules 42 are configured to perform (or cause the computer system/server 12 to perform) one of more functions of the client sourced data restore 96 of FIG. 3. For example, the one or more of the program modules 42 of the client sourced data restore 96 may be configured to determine a relevance of objects by performing an assessment of references of an object across a plurality of clients; create a distributed cache of objects across a plurality of clients based on the reference assessment; update the distributed cache of objects based on a plurality of factors including available storage on the clients, reference assessments, availability of network resources, and availability of computing resources; analyze every restore request to determine if required data is contained on the distributed cache of objects; and perform a restore by prioritizing local resources on the distributed cache of objects.

Figure 4:
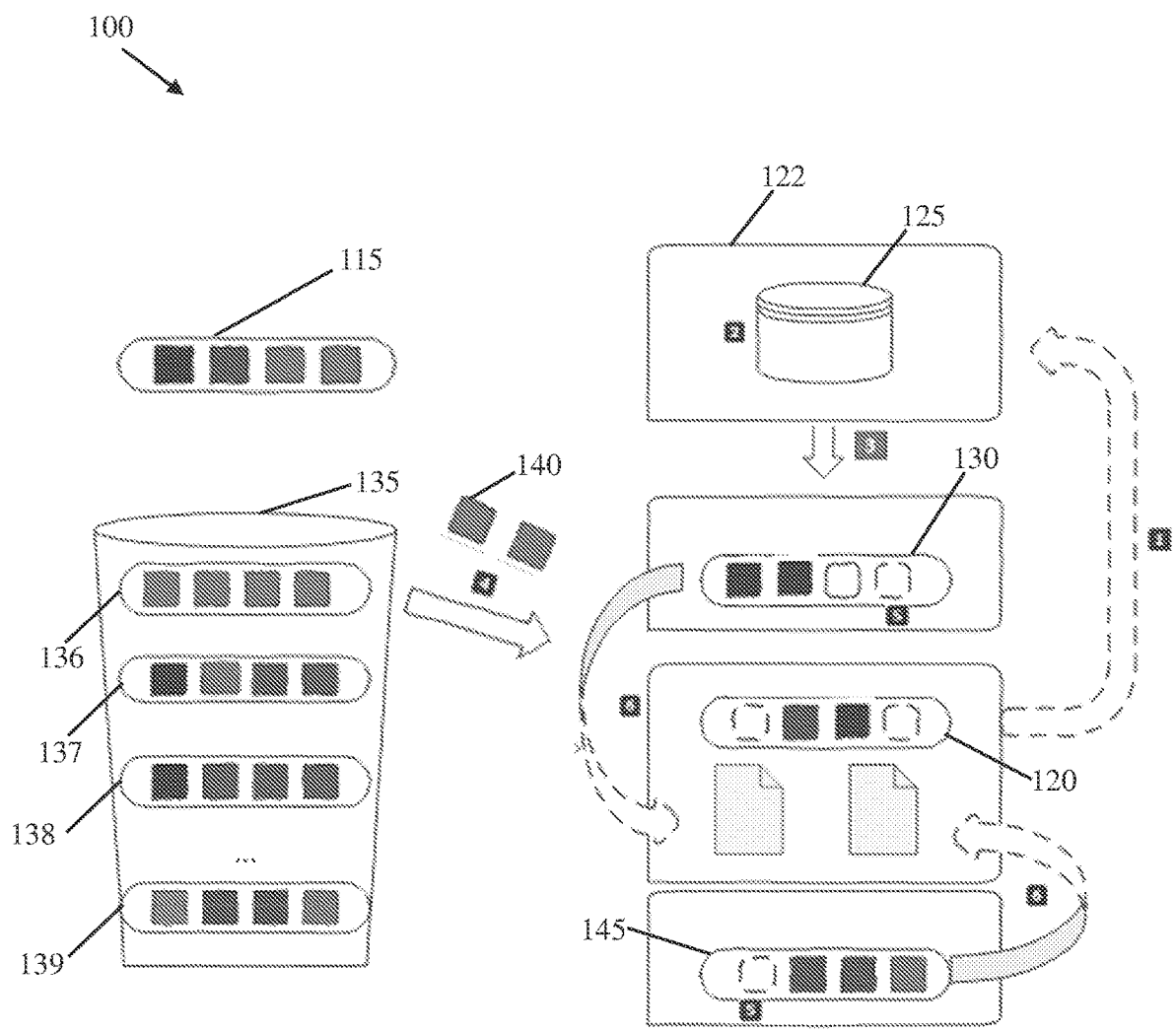
FIG. 4 shows a diagram of an object storage platform in accordance with aspects of the invention.

FIG. 4 shows a diagram of an object storage platform in accordance with aspects of the invention. In embodiments, an object storage platform 100 comprises an object storage 135. The object storage 135 comprises a first object 136, a second object 137, a third object 138, . . . , and a nth object 139. In embodiments, n is an integer which represents the nth object 139 of the object storage 135. A backup server 122 comprises a deduplication database 125. The deduplication database 125 saves a copy of data from a client 120. In particular, the backup server 122 compares the copy of the data from the client 120 saved in the deduplication database 125 to objects in the object storage 135 to determine which objects have changed.

In FIG. 4, at step 1, the client 120 initiates a data restore request between the client 120 and the backup server 122 for requested data 115. At step 2 of FIG. 4, the backup server 122 consults its metadata in the deduplication database 125 to determine which objects are required for the data restore request). At step 3 of FIG. 4, the backup server 122 queries a client population to determine which client has resources and network cardinality to assist in the data restore request. In the example of FIG. 4, a first assisting client 130 and second assisting client 145 have been determined to have the resources and network cardinality to assist in the data restore request. In particular, the first assisting client 130 and the second assisting client 145 are clients which are used to crowd source cached data (e.g., at least one object) from the object storage 135 to perform the data resource request for the client 120. However, embodiments are not limited to two assisting clients as shown in FIG. 4, and any integer number greater than zero of assisting clients may be used to assist the data restore request.

In FIG. 4, at step 4, each determined client (e.g., the first assisting client 130 and the second assisting client 145) retrieves a retrieved object 140 from the object storage 135. In embodiments, the retrieved object 140 comprises at least one object which contains relevant data for the data restore request. At step 5 of FIG. 4, each determined client (e.g., the first assisting client 130 and the second assisting client 145) prunes out object content not needed for the data restore request. At step 6 of FIG. 4, each determined client (e.g., the first assisting client 130 and the second assisting client 145) gathers remaining content not found on the crowd source cache from a most relevant object from the object storage 135.

Figure 5:
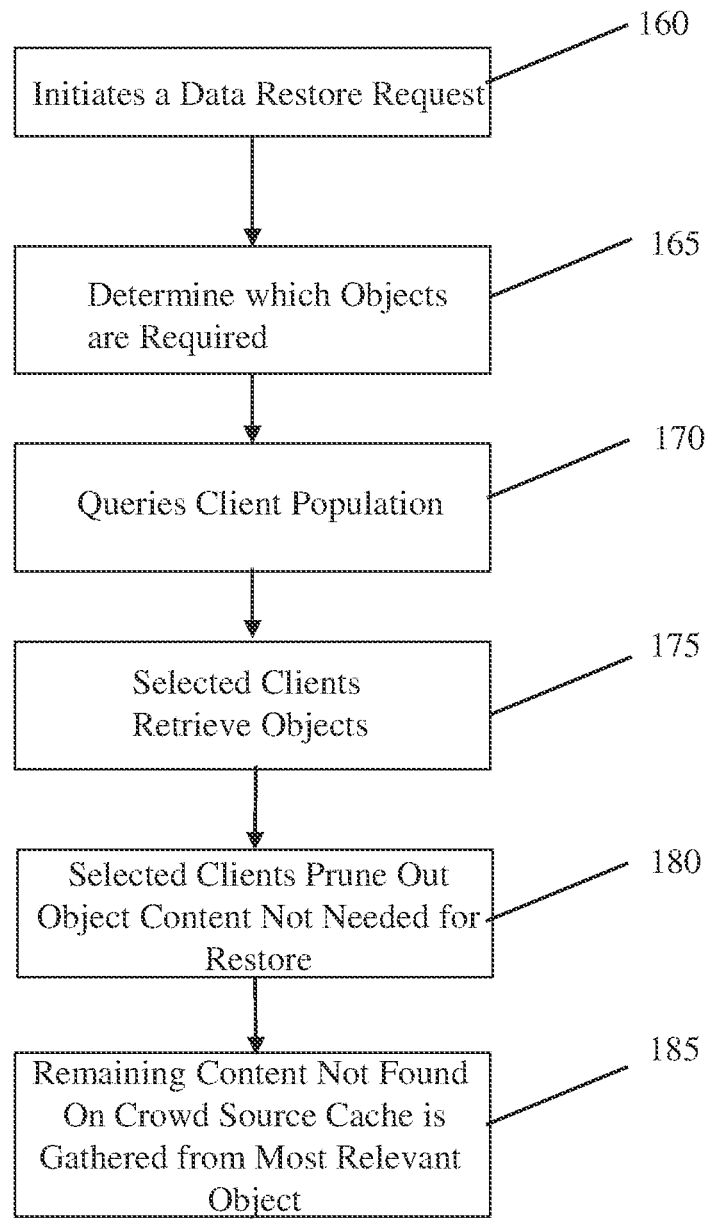
FIG. 5 shows a flowchart of the object storage platform of FIG. 4 in accordance with aspects of the invention.

FIG. 5 shows a flowchart of the object storage platform of FIG. 4 in accordance with aspects of the invention. In FIG. 5, at step 160, a client 120 initiates a data restore request. At step 165, a backup server 122 determines which objects are required for the data restore request. In particular, the backup server 122 determines which objects are required by consulting metadata in the deduplication database 125. At step 170, the backup server 122 queries a client population. In particular, the backup server 122 queries the client population to determine which client has resources and network cardinality to assist the data restore request. In particular, the network cardinality may comprise network speed and network latency of each client; although other network metrics are also contemplated herein. At step 175, each selected client (e.g., determined clients which satisfy resource and network cardinality requirements) retrieves objects (e.g., the retrieved object 140) which contain relevant data from the object storage 135. Step 175 will be described in more detail in FIG. 6.

At step 180 of FIG. 5, each selected client (e.g., determined clients which satisfy resource and network cardinality requirements) prunes out (i.e., filters out) object content not needed for the data restore request. At step 185, each selected client (e.g., determined clients which satisfy resource and network cardinality requirements) gathers remaining content not found on the crowd source cached from a most relevant object from the object storage 135.

Figure 6:
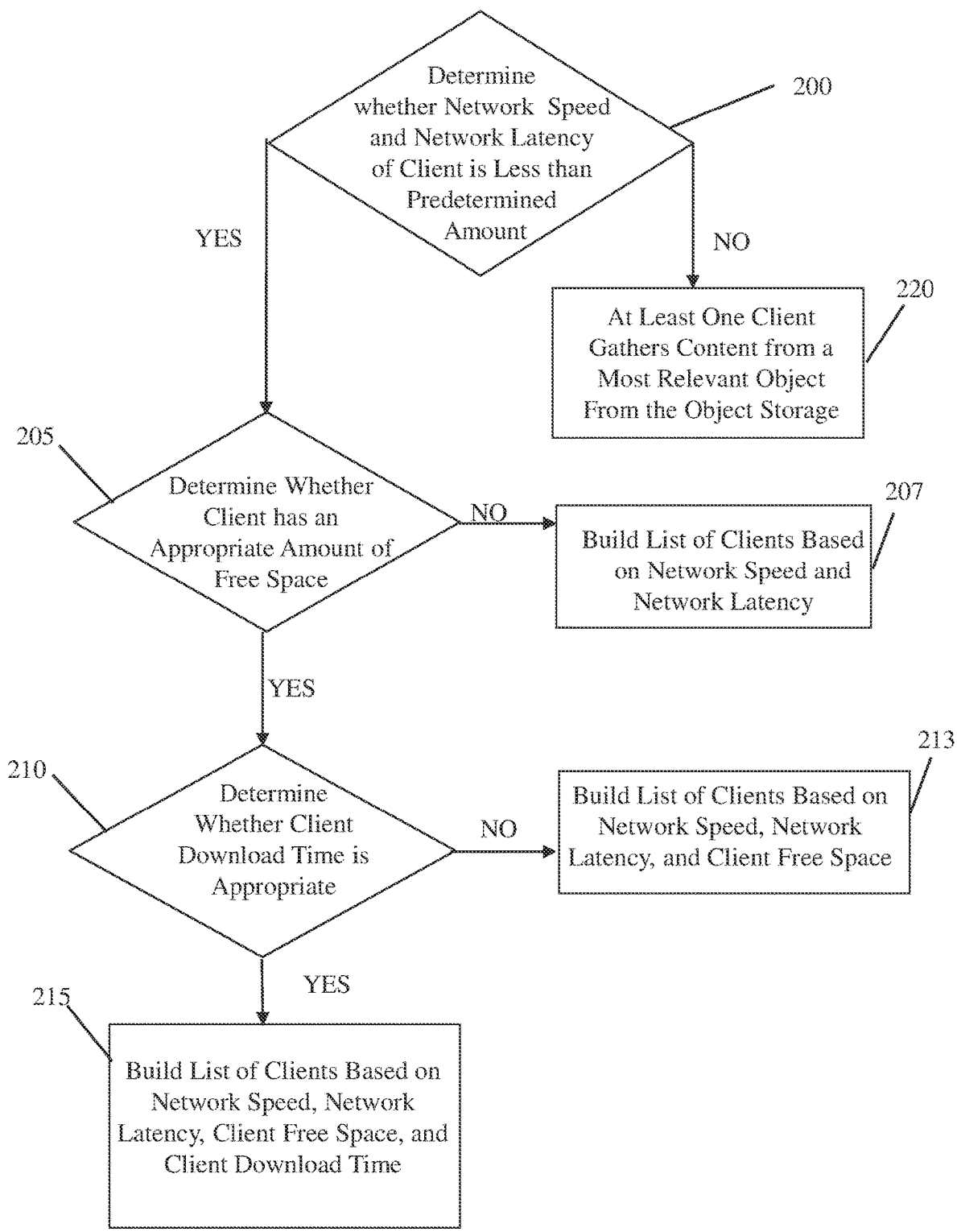
FIG. 6 shows a flowchart of finding assisting clients according to embodiments of the present invention.

FIG. 6 shows a flowchart of finding assisting clients according to embodiments of the present invention. In FIG. 6, at step 200, the backup server 122 queries a client population to determine whether network speed and network latency of each client within the client population is less than a predetermined amount (i.e., satisfies a network speed requirement and a network latency requirement). In a non-limiting example, the predetermined amount may be 10 milliseconds; although embodiments are not limited to this value. If there is no client within the client population that has the network speed and network latency less than the predetermined amount (i.e., NO to step 200), then the process proceeds to step 220 (i.e., at least one client from the client population gathers content not found on the crowd source cache from a most relevant object from the object storage). At step 205, for each client which has the network speed and the network latency less than the predetermined amount (i.e., YES to step 200), the backup server 122 determines which client also has an appropriate amount of free space (i.e., greater than a predetermined amount of free space). A client which has the appropriate amount of free space satisfies the free space requirement. At step 205, even if none of the clients have an appropriate amount of free space (i.e., NO to step 205), the backup server 122 at step 207 will use each client which has the network speed and the network latency less than the predetermined amount for the built list of clients.

At step 210 of FIG. 6, for each client which has the network speed and the network latency less than the predetermined amount and the amount of free space greater than a predetermined amount of free space (i.e., YES to step 205), the backup server 122 determines which client also has an appropriate download time (i.e., less than a predetermined download time). At step 205, even if none of the clients have an appropriate download time (i.e., NO to step 210), the backup server 122 at step 213 will use each client which has the network speed and the network latency less than the predetermined amount and the amount of free space greater than a predetermined amount of free space for the built list of clients. A client which has the appropriate download time satisfies the download time requirement. At step 215, the backup server 122 builds up a list of clients based on network speed and network latency of each client being less than the predetermined amount, the amount of free space of each client being greater than the predetermined amount of free space, and the download time being less than the predetermined download time (i.e., YES to step 210).

In an exemplary embodiment, an algorithm to implement the flowchart of finding assisting clients of FIG. 6 may include the following code:

```
crowdsourceclientlist = [ {name:client 1}..{name client n}]
restoretargetclient=clientxzy
datatoretrieve=XTB
define function iperfnetworktest ( )
return [networkspeed,networklatency]
define function downloadsyntheticobject( )
return downloadtimeinseconds
for client in crowdsourceclientlist: # filter out remote clients
    client['networkresultslist'] = iperfnetworktest ( )
    if client.networkresultslist[0] <10ms:
        localclientlist.append(client)
for client in localclientlist: #ensure clients have free storage
    client['freespace'] = getclientfreespace( )
    client['totalspace'] = getclienttotalspace( )
    if client.freespace> datatoretrieve/50:
        if client.freespace > clienttotalspace *.25
            prunedclientlist.append(client)
for client in prunedclientlist:
    uploadsyntheticobject(client)
for client in purnedclientlist: #run concurrent performance test on object retrieval
    thread.start_new_thread(client['downloadtime']=downloadsyntheticobject)
    averagdownloadtime=mean(client.downloadtime)
for client in prunedclientlist:
if client.downloadtime< averagedownloadtime*1.5:
        finalclientlist.append(client)                    (first algorithm).
```

The algorithm above determines which clients may assist the data restore request. In embodiments, the first algorithm may be proactively and periodically executed with the results of the algorithm (i.e., the built list of clients) being cached. In particular, the algorithm maximizes parallelism by considering a free space of the client.

Figure 7:
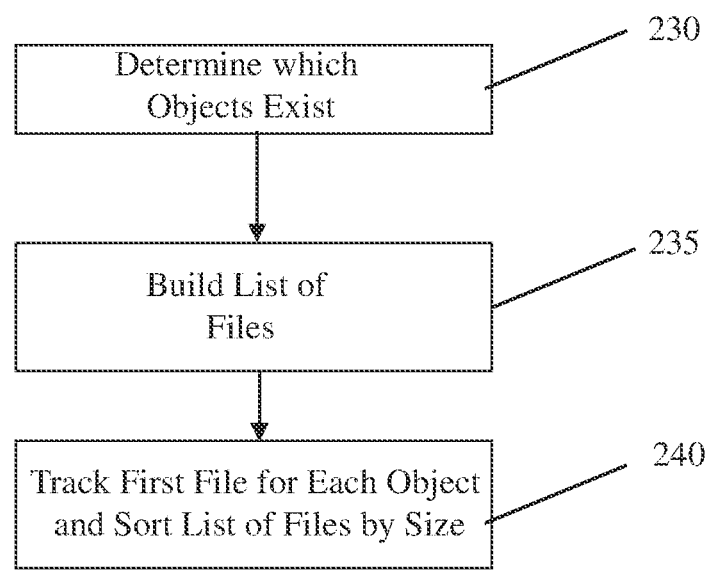
FIG. 7 shows a flowchart of building and sorting a list of files according to embodiments of the present invention.

FIG. 7 shows a flowchart of building and sorting a list of files according to embodiments of the present invention. In FIG. 7, at step 230, the backup server 122 determines which objects exist. At step 235, the backup server 122 builds a list of files which contain the existing objects. At step 240, the backup server 122 tracks the first file for each object to reference it and also sorts the list of files by size. In embodiments, by tracking the first file for each object, when an object is needed for multiple files, the object may be pulled locally instead of having to retrieve the object from object storage twice.

In an exemplary embodiment, an algorithm to implement the flowchart of building and sorting the list of files of FIG. 7 may include the following code:

```
filelist=[file 1...file n] #list of files to restore
for file in filelist: #
    file['objectlist']=backupmetadataretrieve[file]
    for object in file['objectlist']
        object['referenceount']+=1
        if object.get("referencount")=1
            object['referencelist'].append(file)
filelist.sortbysizes( )                                (second algorithm).
```

The algorithm above maximizes a write performance on a machine being restored by only performing full file transfers between the assisting clients and the end client. In embodiments, the algorithm places all of the objects needed for a given file on a single machine to avoid retrieving the same object over and over again if multiple files reference the same object.

Figure 8:
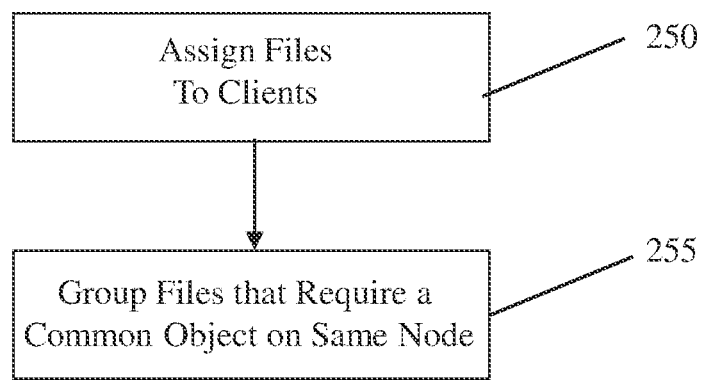
FIG. 8 shows a flowchart of assigning files to clients according to embodiments of the present invention.

FIG. 8 shows a flowchart of assigning files to clients according to embodiments of the present invention. In FIG. 8, at step 250, the backup server 122 assigns files to clients. At step 255, the backup server 122 groups files that require a common object on a same node in order to assign files to clients using a recursive function.

In an exemplary embodiment, an algorithm to implement the flowchart of assigning files to clients of FIG. 8 may include the following code:

```
Define fileassignmentfunction(filelist,clientlist,startingclientindex)
i= startingclientindex
For file in filelist:
    If file.get("assignedclient") = None
        while clientlist[i].getremainingspace( ) < file.get("size")
            i+=1
        File.assign(clientlist[i])
        File.set("assignedclient") = clientlist[i]
        For object in file['objectlist']
            If object.get("referencecount")>1
                relatedfileslist=object['referencelist']
Fileassignmentfunction(relatedfileslist,clientlist,i)             (third algorithm).
```

The algorithm above assigns files to clients using the recursive function to attempt to group files that require the common object together on the same code.

Figure 9:
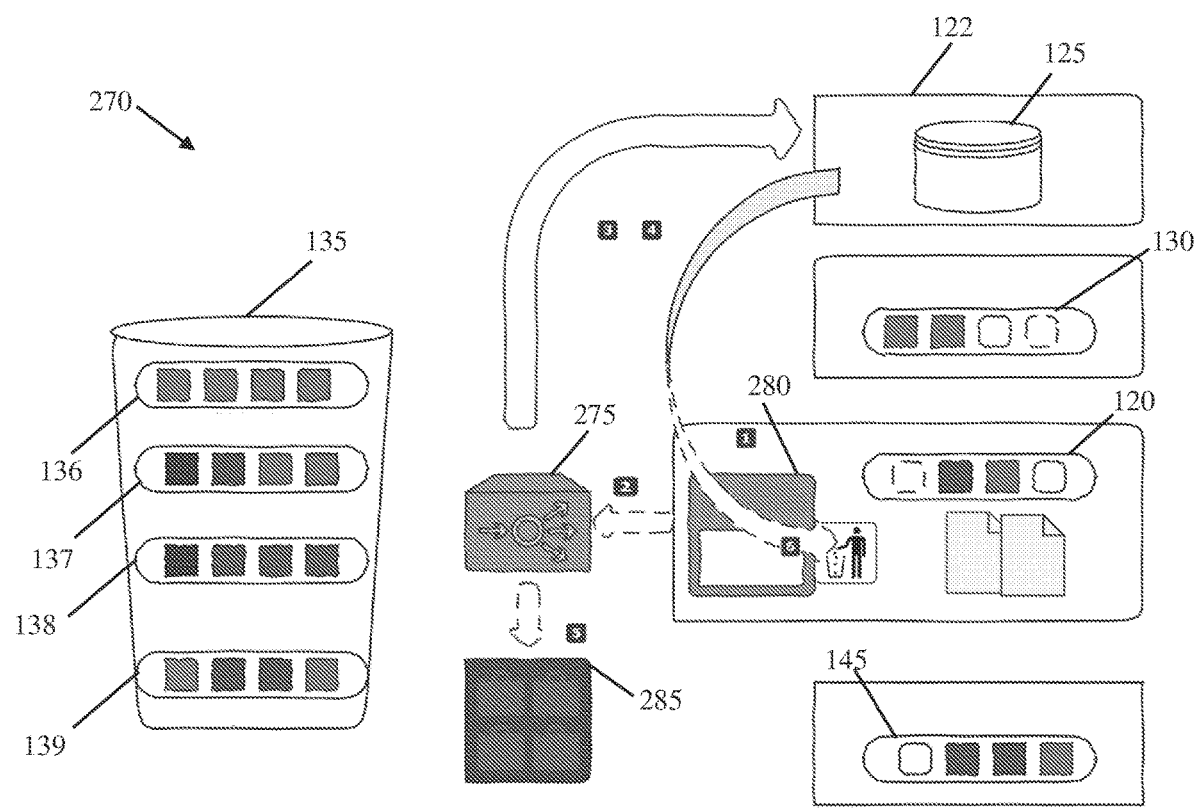
FIG. 9 shows a diagram of a first phase of another object storage platform according to embodiments of the present invention.

FIG. 9 shows a diagram of a first phase of an alternative object storage platform according to embodiments of the present invention. In FIG. 9, embodiments include an external addon (e.g., a proxy 275) which may be added to known backup products. By adding the proxy 275 between the backup server 122 and the object storage 135, the complete list of objects needed for a restore may be determined without direct access to a product's internal metadata repository and the client population may be used in retrieval operations without requiring changes to a backup client product code.

In embodiments of FIG. 9, flexibility may be provided for how a crowd sourcing is accomplished. For example, a small worker agent or external addon (e.g., the proxy 275) may be injected into an existing client population or spin up ephemeral machines using spot instances at a very low cost. Further, FIG. 9 shows a first phase of the object storage platform 270 in which the object inventory is built.

In embodiments, the object storage platform 270 includes the client 120 being restored, the backup server 122, the deduplication database 125, the first assisting client 130, the object storage 135, the first object 136, the second object 137, the third object 138, the nth object 139, a retrieved object 140, the second assisting client 145, a proxy 275, an addon utility 280, and an object inventory list 285. In particular, the object storage 135 comprises the first object 136, the second object 137, the third object 138, . . . , and the nth object 139. In embodiments, n is an integer which represents the nth object 139 of the object storage 135. The backup server 122 comprises the deduplication database 125.

In FIG. 9, at step 1, the client 120 initiates a data restore request through the addon utility 280. At step 2, the addon utility 280 notifies the proxy 275 that the data restore request has been initiated. At step 3, the backup server 122 attempts to retrieve data from the deduplication database 125. At step 4, the proxy 275 instantly responds with locally generated objects of a correct size containing all zeroes.

At step 5 of FIG. 9, the proxy 275 notes which objects were requested (i.e., represented by the numeral 5 in the black box near an arrow between the proxy 275 and the object inventory list 285). At step 6, as the data is sent to the client 120, the data is discarded by the backup server 122 by redirecting the data restore request to a null directory.

After the first phase of the object storage platform 270 in FIG. 9 is complete, the object storage platform 270 has a complete list of the objects that are required to fulfill an object storage. Embodiments can start a process of retrieving objects by taking a list of participating crowd sourcing clients and splitting the objects between them. In embodiments, the process of retrieving objects takes into account the order the objects were requested so prioritization is done based on the order the objects were requested.

Figure 10:
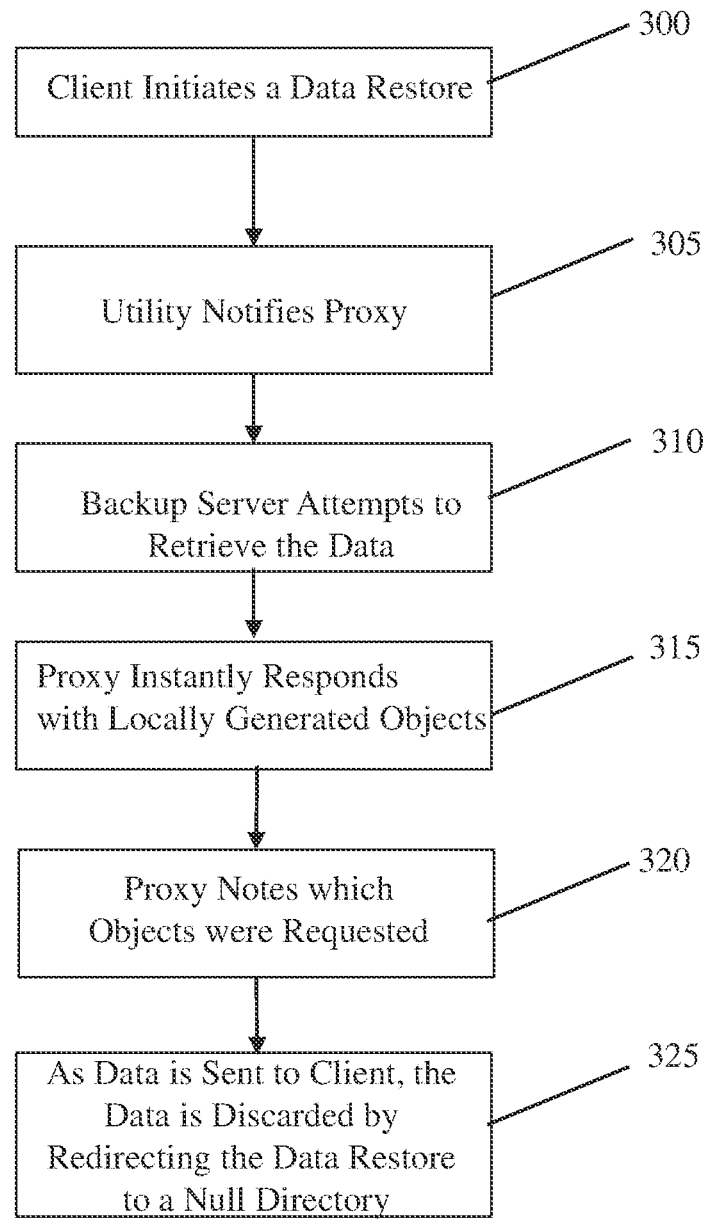
FIG. 10 shows a flowchart of the first phase of the object storage platform of FIG. 9 according to embodiments of the present invention.

FIG. 10 shows a flowchart of the first phase of the alternative object storage platform of FIG. 9 according to embodiments of the present invention. In FIG. 10, at step 300, the client 120 initiates a data restore request. At step 305, the addon utility 280 notifies the proxy 275 that the client 120 initiated the restore request. At step 310, the backup server 122 attempts to retrieve data. At step 315, the proxy 275 instantly responds with locally generated objects of a correct size containing all zeroes. At step 320, the proxy 275 notes which objects were requested. At step 325, as the data is sent to the client 120, the backup server 122 discards the data by redirecting the data restore request to a null directory.

Figure 11:
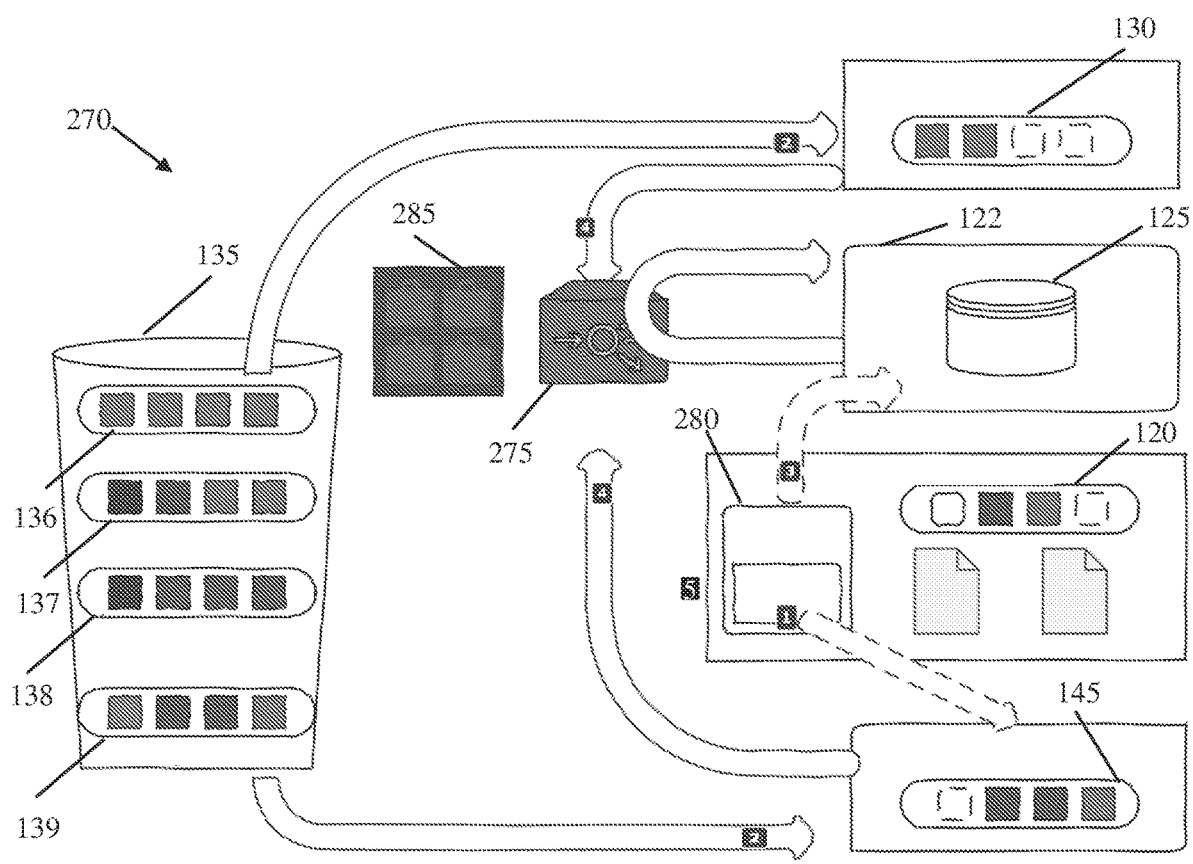
FIG. 11 shows a diagram of a second phase of an object storage platform according to embodiments of the present invention.

FIG. 11 shows a diagram of a second phase of an alternative object storage platform according to embodiments of the present invention. In embodiments, FIG. 11 shows the second phase of the object storage platform 270 in which the objects are retrieved. At step 1, the addon utility 280 creates spot instances and/or identifies unused resources on existing clients (e.g., first assisting client 130 and second assisting client 145) for staging and processing the necessary objects. At step 2, the assisting clients (e.g., first assisting client 130 and second assisting client 145) retrieve batches of the necessary objects from the object storage 135 based on the order they were requested in step 1 (between the first assisting client 130 and the object storage and a second arrow between the second assisting client 145 and the object storage 135). At step 3, the addon utility 280 re-initiates a restore operation within a backup software (i.e., between the addon utility 280 and the backup server 122).

At step 4 of FIG. 11, the proxy 275, by fulfilling the backup software, get requests (i.e., receive requests) using local versions of the objects on the assisting clients (e.g., first assisting client 130 and second assisting client 145) (i.e., between the proxy 275 and the first assisting client 130 and a second arrow between the proxy 275 and the second assisting client 145). At step 5, the addon utility 280 retains objects that are referenced multiple times so that they are locally available for subsequent reads and discards objects that are only referenced once after they are no longer needed.

Figure 12:
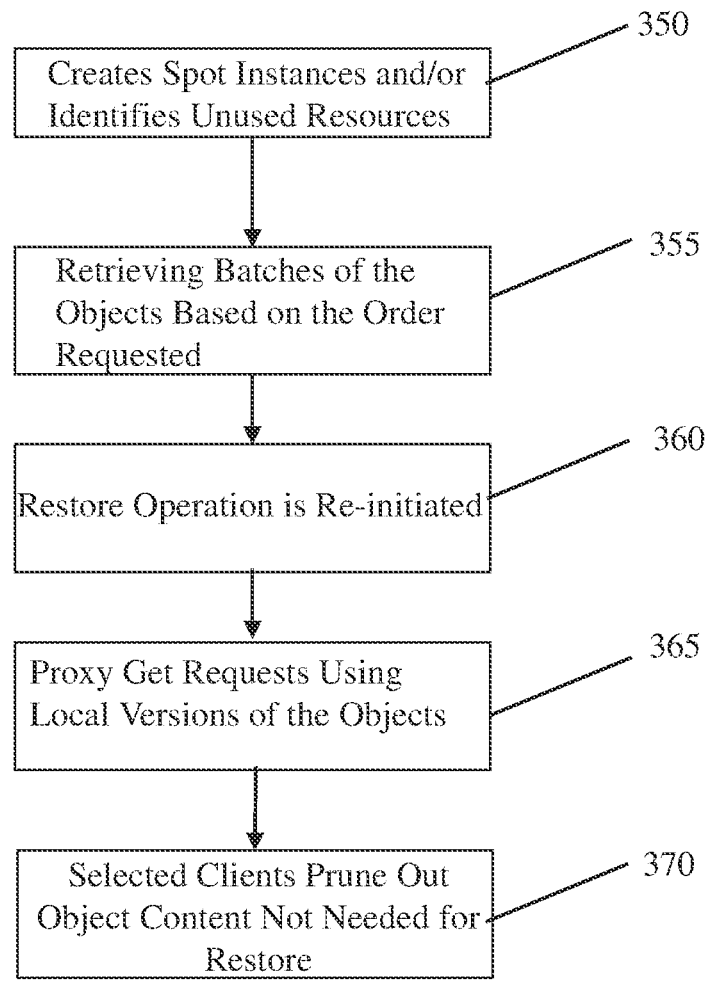
FIG. 12 shows a flowchart of the second phase of the object storage platform of FIG. 11 according to embodiments of the present invention.

FIG. 12 shows a flowchart of the second phase of the another object storage platform of FIG. 11 according to embodiments of the present invention. In FIG. 12, at step 350, the addon utility 280 creates spot instances and/or identifies unused resources on existing clients (e.g., first assisting client 130 and second assisting client 145) for staging and processing the necessary objects. At step 355, the assisting clients (e.g., first assisting client 130 and second assisting client 145) retrieve batches of the necessary objects from the object storage 135 based on the order they were requested at step 350. At step 360, the addon utility 280 re-initiates a restore operation within a backup software.

At step 365 in FIG. 12, the proxy 275, by fulfilling the backup software, get requests (i.e., receive requests) using local versions of the objects on the assisting clients (e.g., first assisting client 130 and second assisting client 145). At step 370, the addon utility 280 retains objects that are referenced multiple times so that they are locally available for subsequent reads and discards objects that are only referenced once after they are no longer needed. In embodiments, the flowcharts and algorithms associated with FIGS. 6-8 may also be implemented within the context of the object storage platform 270 in FIGS. 9-12.

In embodiments, a service provider could offer to perform the processes described herein. In this case, the service provider can create, maintain, deploy, support, etc., the computer infrastructure that performs the process steps of the invention for one or more customers. These customers may be, for example, a business that tracks worker safety and provides health remediation to improve worker safety. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, a data restore request;
determining, by the computing device, at least one object in response to the data restore request; and
querying, by the computing device, a client population to determine at least one client which has resources and network cardinality to assist the data restore request, wherein the at least one client creates a distributed and crowd source cache of objects for the data restore request.

2. The method of claim 1, wherein the data restore request comprises a request for data within a cloud computing environment.

3. The method of claim 1, wherein the client population comprises a plurality of clients which include the at least one client which satisfies a network latency requirement, a network speed requirement, a free space requirement, and a download time requirement.

4. The method of claim 1, further comprising determining, by the computing device, a plurality of objects which exist.

5. The method of claim 4, further comprising building, by the computing device, a list of files which contain the existing objects.

6. The method of claim 5, further comprising tracking, by the computing device, a first file for each of the existing objects.

7. The method of claim 1, further comprising assigning, by the computing device, a plurality of files to a plurality of clients.

8. The method of claim 7, further comprising grouping, by the computing device, the files that require a common object on a same node in response to the plurality of files being assigned to the plurality of clients.

9. The method of claim 1, wherein the client population is queried periodically to determine the at least one client which has the resources and the network cardinality.

10. The method of claim 1, further comprising caching, by the computing device, a result of the determined at least one client which has the resource and the network cardinality.

11. A computer program product comprising one or more computer readable storage media having program instructions collectively stored on the one or more computer readable storage media, the program instructions executable to:
   initiate a data restore request;
   respond to the data restore request with locally generated objects of a size corresponding to the data request, the locally generated objects containing zeros; and
   receive data corresponding to the data request.

12. The computer program product of claim 11, wherein the program instructions are further executable to discard the data by redirecting the data restore request to a null directory.

13. The computer program product of claim 11, wherein the program instructions are further executable to identify unused resources on a plurality of clients.

14. The computer program product of claim 11, wherein the program instructions are further executable to re-initiate the data restore request within a backup software.

15. The computer program product of claim 14, wherein the program instructions are further executable to fulfil the backup software by receiving a request using local versions of the locally generated objects.

16. The computer program product of claim 11, wherein the program instructions are further executable to retain a plurality of objects that are referenced multiple times so that they are locally available for subsequent read operations.

17. The computer program product of claim 16, wherein the program instructions are further executable to discard another plurality of objects that are referenced once after the plurality of objects are not needed.

18. A system comprising: a processor, a computer readable memory, one or more computer readable storage media, and program instructions collectively stored on the one or more computer readable storage media, the program instructions executable to: receive a data restore request; determine at least one object in response to the data restore request; and query a client population to determine at least one client which has resources and network cardinality to assist the data restore request, wherein the at least one client satisfies a network latency requirement, a network speed requirement, a free space requirement, and a download time requirement.

19. The system of claim 18, wherein the client population is queried periodically to determine the at least one client which has the resources and the network cardinality.

* * * * *